INVENTORS
BRYAN J. O'SULLIVAN
ROBERT R. SMYTH
BY Rosen & Schiller
ATTORNEYS

INVENTORS
BRYAN J. O'SULLIVAN
ROBERT R. SMYTH
BY
Rosen & Schiller
ATTORNEYS

United States Patent Office 3,351,770
Patented Nov. 7, 1967

3,351,770
A.C. POWER SYSTEM HAVING D.C. DRIVEN STANDBY POWER SUPPLY
Bryan J. O'Sullivan, Wakefield, and Robert R. Smyth, Lincoln, Mass., assignors to Technical Operations Inc., Burlington, Mass., a corporation of Delaware
Filed Mar. 12, 1964, Ser. No. 351,335
15 Claims. (Cl. 307—64)

This invention relates to electrical power supplies, and more particularly to devices for supplying alternating current to a load from a storage source of direct current when there is a failure in the normal A.C. power line feeding such load.

A number of standby power supply systems are known whereby A.C. power derived from a direct current storage device, such as the battery, is automatically made available upon the failure or discontinuance of A.C. power from a normally available line source. In the event of failure of the normal power line, it is usually desirable to shift to the standby power source in a manner which minimizes any interruption in the current flow of the ultimate load. To this end, a large number of schemes have been devised for automatically switching the load between the normal A.C. power lines and the standby power source. In such devices, of course, the transient interruption of current, due to the shift between sources, depends upon switching time and the nature of the switch. For example, mechanical switches operated by electrical relays are comparatively slow and may also introduce transient peaks due to contact resistance and circuit inductance, bounce and the like. Faster switching speeds have been achieved through the use of electronic switch devices such as silicon controlled rectifiers. However, to achieve minimum power interruption, these devices require constant sensing and transfer techniques which are quite complex. Other systems are known which avoid switching through the use of circuitry which parallels the outputs of a pair of current limiting transformers, one in the normal A.C. power line, the other in the inverter output. This places individual large impedances in both the A.C. and inverter lines and is thus quite inefficient; either transformer may be run at its full capacity and there tend to be large currents circulating between the two units.

The present invention has a principal object thereof the provision of a standby power supply system which, in the event of failure of the normal A.C. power line to supply the requisite current to a load, will supply the needed power substantially without any discontinuity in the flow of current to the load. Another object of the present invention is to provide a standby power supply transfer system whereby the current requirements of a load can be shifted between a normal A.C. power line and the output of an inverter without the use of switches. Yet other objects of the present invention are to provide a standby power system capable of co-operating with a normal A.C. power input line so as to provide proportional current to a load depending upon the level of the A.C. voltage across the normal power line; to provide such a system wherein the standby power supply comprises D.C. to A.C. inverter means which is connected in parallel with a normal source of A.C. power so that a load being fed by the power line is simultaneously connected to the inverter means; and to provide a standby power system which includes inverter means, a reactive impedance, means for connecting said reactive impedance in series with the normal A.C. power line and for connecting the latter in parallel with the inverter output such that said reactive impedance provides a minimum impedance to said inverter in the event of short circuit of the A.C. power line.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

To achieve the foregoing objects, generally the present invention, which is adapted to be coupled between a load and an ordinary A.C. power line, comprises inverter means having input terminal means adapted to be connected to a D.C. storage device, such as a battery, and output terminal means adapted to be connected across the load. The invention also includes a reactive impedance, and means for connecting to the normal A.C. power line in series through the reactive impedance and in parallel with the output terminal means of the inverter means. The magnitude of the reactive impedance is such that, in the event of a dead short circuit of the power line, it provides a minimum impedance (i.e. maximum load) across the output terminal means of the inverter means. In any event, the impedance is such that the total current drawn by the combined maximum rated load and the impedance does not exceed the power output capability of the inverter means. In a preferred embodiment of the invention there is also included means for maintaining a predetermined phase relation between any A.C. voltage across the normal power line and the A.C. voltage across the output terminals of the inverter means.

Figure 1:
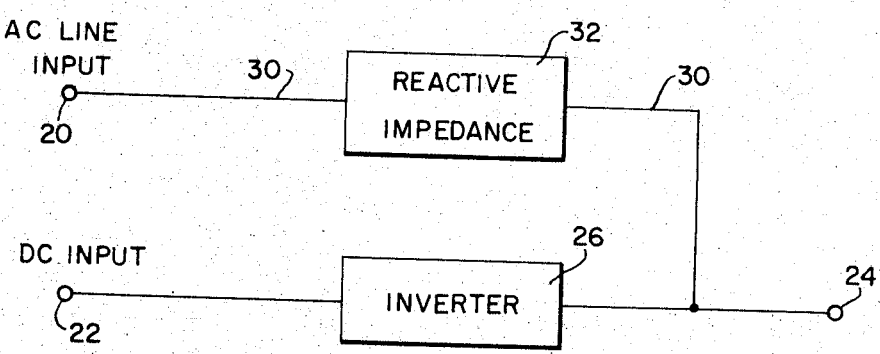
FIG. 1 is a block diagram illustrating the general principle of the present invention.

Referring now specifically to the drawings there are shown block diagrams of embodiments incorporating the principles of the present invention in which the solid lines joining the blocks are intended to be indicative of substantially power-carrying paths whilst the dotted lines joining certain of the blocks are intended to indicate substantially control-signal-carrying paths. As shown in FIG. 1 the device includes terminal means 20 for connecting the invention to an ordinary A.C. power source such as the usual 60 cycle commercial line, and terminal means 22 for connecting the device to a separate D.C. storage means, such as an electrochemical storage battery. A third or output terminal means 24 is provided for coupling the A.C. output of the invention to a load to be driven, typically a transformer primary, the field coils of an induction motor, or the like.

Means are provided for converting D.C. imposed at terminal means 22 to alternating current which is available at terminal means 24, and in the form shown comprises inverter 26, the input of which is coupled to terminal means 22. The output of inverter 26 is connected to terminal means 24.

For coupling A.C. input terminal means 20 to output terminal means 24 the device includes means, in the form shown, comprising power line 30 connecting terminal means 20 and 24 to one another through series reactive impedance 32.

FIG. 1 thus described is intended to function primarily to deliver A.C. power to terminal means 24, and is essentially a system which, when terminal means 20 and 22 are respectively connected to the usual A.C. power line and D.C. battery, places the output of the inverter in parallel with the A.C. line. Inverter 26 is preferably of the type disclosed, for example in FIG. 8.43 and described at pages 138–139 of Controlled Rectifier Manual, first edition, General Electric Company, 1960, or as disclosed in co-pending application Ser. No. 180,561 filed Mar. 19, 1962.

Such D.C.–A.C. inverters are low impedance sources and are therefore capable of supplying a large amount of power. Because of the presence of at least reactive impedance 32, for example in the form of an inductive choke, in A.C. line 30 between terminal means 20 and 24, the A.C. line is then, with respect to the inverter a high impedance, preferably such that line 30 when at a predeterminedly low voltage is just capable of supplying full power to a given load. The reactive impedance, while it makes line 30 act as a high impedance feeding such a load, also provides a minimum impedance value looking from the load back into line 30, for example in the event of complete failure such as a short circuiting of the A.C. source feeding terminal 20. Thus, the inverter is preferably intended to deliver an alternating wave form of approximately equal amplitude and frequency and of about the same phase as is the voltage on line 30; the maximum fundamental or harmonic current flow between the two sources will then be limited, i.e. if the A.C. line voltage and inverter output voltage are of approximately equal magnitude and of approximately the same phase and frequency, there will be a minimum of lost power. The A.C. input provided by the normal power line is however of somewhat higher voltage than the inverter output so that the A.C. line will supply most of the power to the load. If line 30 fails short, open or drops slowly, the inverter will deliver the necessary proportion of the power to maintain the load and in addition the power required by the total impedance of the A.C. line. The assumption of the load by the output of the inverter thus requires no switching.

Figure 2:
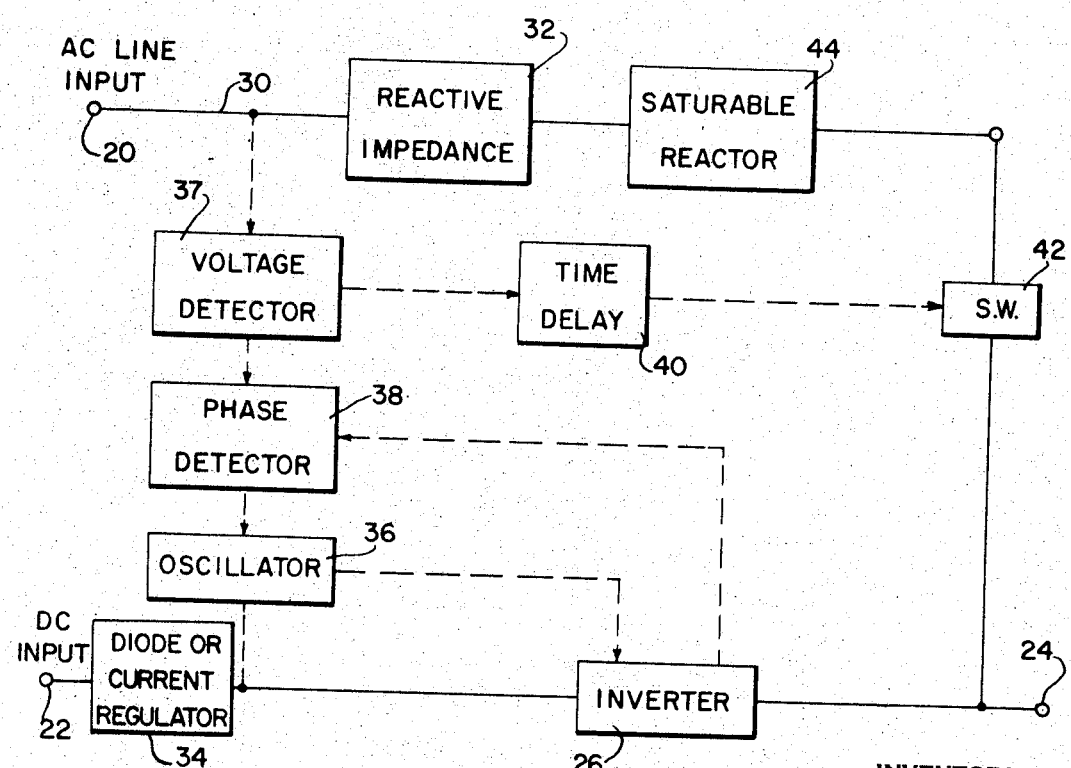
FIG. 2 is a block diagram illustrating another embodiment of the invention.

Referring now to FIG. 2, there is shown a block diagram of a system incorporating the principles and elements of the embodiment of FIG. 1, like numerals denoting like parts.

In order to maintain a substantially constant potential to the load present on power line 30, as imposed by both the inverter and whatever load is connected to output terminal means 24, there is included in the embodiment of FIG. 2, means for varying the phase of the inverter in accordance with the phase of the normal A.C. power imposed at terminal means 20. Current flow from terminal means 20 through reactive impedance 32 will lower the voltage available to a load at terminal means 24. If inverter 26 is approximately in phase with the line, the current flow from the latter to the inverter will be at a minimum and line 30 is capable of supplying all of the power required by the load. It can be assumed that this condition is one which may be characterized as low line and full load. Reduction of the load or a rise in the normal A.C. power line input will cause a rise in the voltage supplied by line 30 to both the load and inverter. If the inverter lags the input line, such rise in the voltage will be counteracted; the inverter then being a low impedance will draw current from the line through the reactive impedance and lower the voltage applied to both the load and inverter. On the other hand, if the load exceeds full load or the normal A.C. line input voltage drops, the voltage applied by line 30 to the load and inverter will go down. If the inverter output voltage is set at a value which represents the above mentioned full load and low line condition, then the drop in line 30 voltage below such an inverter output voltage allows the inverter to pick up its proportional share of the load.

The voltage of line 30 will normally be set slightly higher than the inverter output, i.e. of the same order of magnitude but somewhat higher, e.g. 5 volts in 115. Thus, with an inverter of the type described, it is desirable to provide means, such as a unilateral current conduction device or diode 34, to protect any battery connected to terminal means 22. Diode 34 can be placed in series between inverter 26 and terminal means 22 so as to be back-biased by the normally higher line voltage. In this manner the normally higher line voltage will not affect any battery which is appropriately poled in its connections to terminal means 22. Under such circumstances, the inverter will run on line power, not battery power and is backwards in nature. Alternatively, with appropriate circuitry well known in the art, it is possible to replace diode 34 with means for regulating current flow so as to tend to maintain any battery appropriately connected to input terminal means 22 in a fully charged condition when the inverter is running backwards.

As hereinbefore described, it is intended that when the line voltage drops below the level of the normal inverter output voltage, the inverter will pick up the load which is, at its maximum, that provided by reactive impedance 32. In order to effect the foregoing operation, a preferred embodiment of the invention as shown in FIG. 2 therefore includes means, such as variable frequency oscillator 36, connected to inverter 26 for providing an alternating waveform at a frequency which controls the output frequency of the inverter. Typically, oscillator 36 can be a free running multivibrator powered by the D.C. power-source connected to terminal means 22.

When the A.C. line voltage above a predetermined minimum is present at input terminal means 20, the repetition rate or frequency of the output of oscillator 36 is established by the frequency of the normal A.C. power line. To this end, there is included voltage detector means 37 for determining when the A.C. voltage is above and below the minimum value, and phase detector means 38 which preferably also serves to set the output of oscillator 36 in a predetermined phase relation with the A.C. line voltage when the voltage detector means has determined that the A.C. voltage is above the minimum value. In the event that the A.C. voltage at terminal 20 is below the predetermined minimum, then oscillator 36 is intended to provide a substantially fixed frequency determined, for example, by its own time-constant.

When the line voltage drops below the predetermined minimum, voltage detector means 37 and phase detector means 38 in concert not only are intended to cease setting the oscillator frequency and relative phase, but voltage detector means 37 is also adapted to initiate a control action which, after being delayed by time delay means 40, operates switch means 42 (which may be of the relay type). The latter is preferably in line 30 and is operable to connect and disconnect line 30 from terminal means 24. To obtain maximum efficiency it is desirable to disconnect line 30 from terminal means 24 when the inverter output has picked up a predetermined portion of the load i.e. when the voltage of line 30 has dropped below its predetermined minimum. This need not be done by a high speed switch inasmuch as it is solely for the purpose of maintaining efficiency and not for maintaining a continuous power flow to the load. Conversely, when the commercial line voltage exceeds a predetermined level, phase detector means 38 drives oscillator 36 into synchronism with the line frequency and also provides a signal which, after passage through delay means 40, operates to close switch 42 and place the inverter back into parallel operations with the commercial line. It is apparent that the voltage values for the commercial A.C. source which will respectively result in the provision of signals which will open and close switch means 30 are not the same voltages, thus preventing excessive switching or hunting.

The embodiment of FIG. 2 also includes saturable reactor 44 in line 30 between impedance 32 and switch 42. Saturable reactor 44 preferably is a square loop transformer which will saturate at a slightly higher value than the voltage delivered to the load by the inverter operating at its highest designed D.C. input voltage. It will be apparent that such a square loop transformer will be a relatively high impedance at less than its saturating voltage, but if the average voltage delivered by line 30 rises above this saturating point it will become a low impedance to reduce such voltage rise. Also, should the battery voltage at terminal means 22 rise above its maximum design value, reactor 44 will saturate and cause an increase in current flow from the inverter. If the latter is properly fused, when the current flow is excessive the fuses in the inverter will blow and remove it but not line 30 from the circuit.

Figure 3:
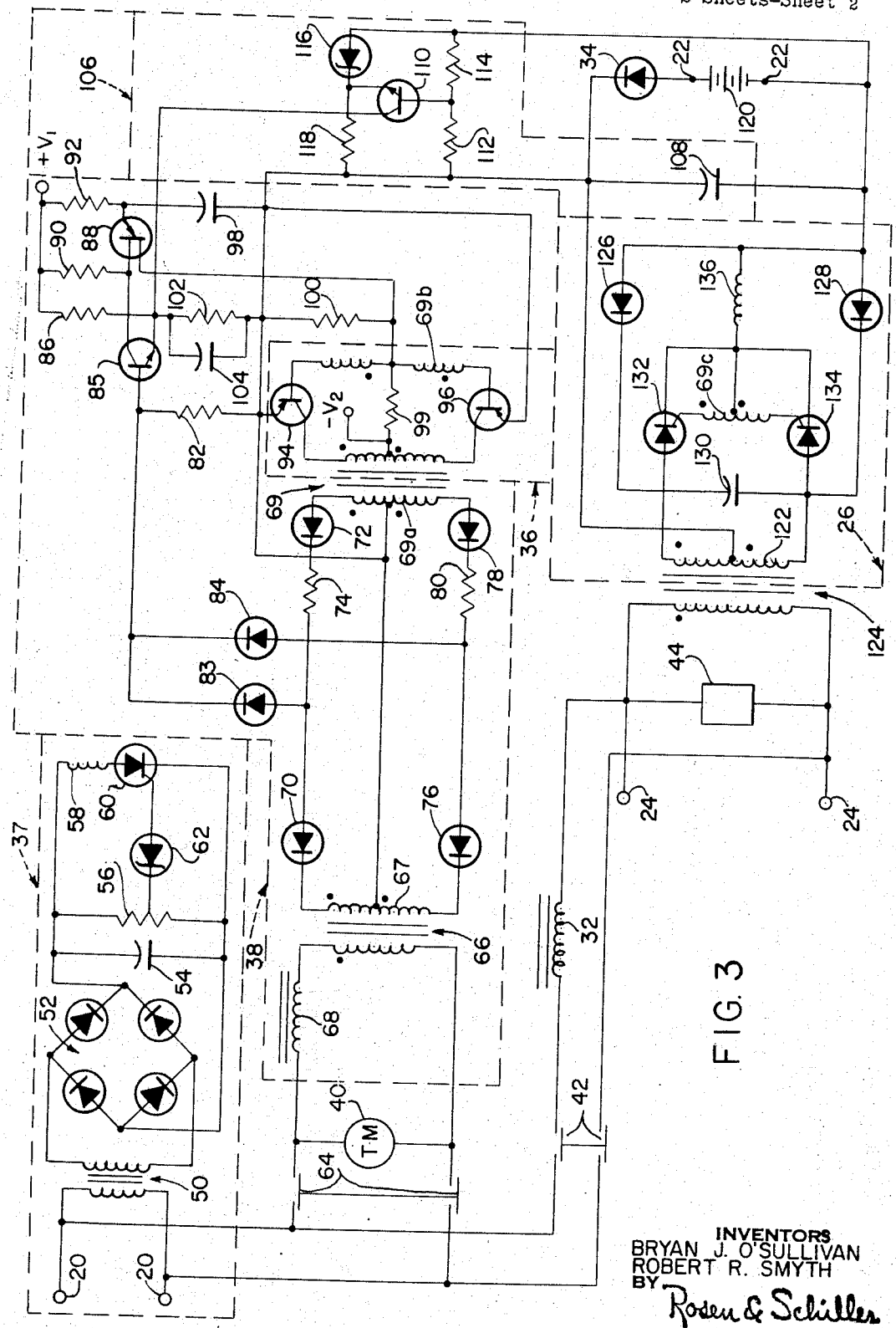
FIG. 3 is a detailed schematic diagram of a circuit embodying the principles illustrated in FIG. 2.

Referring now to FIG. 3 there is shown an exemplary schematic circuit diagram of an embodiment of the invention in simplified form. The A.C. line input is intended to be impressed on terminals 20 which are connected to voltage detector means 37 as by being coupled across a primary winding of transformer 50. Across the secondary winding of transformer 50 is a full-wave diode rectifier bridge 52. The output of rectifier bridge 52 is connected respectively across capacitance 54, variably tapped resistance 56, and the combination of relay coil 58 and silicon controlled rectifier (SCR) 60. As shown, the cathode of SCR 60 is connected in series through relay coil 58 to one output of bridge 52, the anode of SCR 60 being connected to the other side of the bridge. The gate of SCR 60 is connected to the anode of Zener diode 62, the cathode of the latter being connected to the tap to resistance 56.

Input A.C. across transformer 50 is rectified by bridge 52, capacitance 54 serving to average out or smooth ripple in the rectified voltage across the output of the bridge. Tapped resistance 56 allows for adjustment so that a predetermined portion of the bridge output voltage can be applied to Zener diode 62. If the input A.C. voltage is above a predetermined minimum value, e.g. 105 volts, diode 62 will conduct, and the current flow will gate SCR 60 so that it fires, allowing current from the bridge output to flow through coil 58 to energize the relay. If however, the input A.C. voltage should fall below the predetermined minimum voltage level, the anode current will no longer hold SCR 60 in conduction and the SCR will revert to its forward blocking state, deenergising coil 58.

Relay coil 58 is electromechanically coupled to switch contacts 64 connected in a parallel tap across terminals 20 such that when coil 58 is energized (i.e. the voltage detected by detector 37 is above the minimum) contacts 64 are closed, and when coil 58 is deenergized, the contacts are opened. Thus, the A.C. line is coupled or decoupled, according to the operation of coil 58 and contacts 64, to a time delay means 40 and to phase detector 38. Delay means 40 typically is in the form of a well-known timing motor which, when energized, runs a predetermined period of time and then actuates switch 42 to complete a circuit between terminals 20 and output terminals 24 through reactive impedance 32. It will be apparent that the delay provided by the running of the timing motor is desirable in allowing the output of inverter 26 to be set in the approximate proper phase and frequency relation to the line A.C. before switch 42 closes, paralleling the inverter output and the A.C. line. Switch 42 is preferably also coupled to coil 58 so that switch closure, albeit delayed, is effected by the energized coil. In such case, the switch is preferably normally biased open so that upon deenergization of coil 58, switch 42 will disconnect the A.C. line from the load and particularly from the inverter output.

Phase detector 38 includes transformer 66 having its primary winding connectable across terminals 20 by closure of contacts 64. Inductive winding 68, in series with the primary winding of transformer 66 is included to adjust the input phase of the transformer. One end of the secondary winding 67 of transformer 66 is connected to one end of secondary winding 69a of another transformer 69 through series diodes 70 and 72, the diodes in turn being connected anode-to-cathode through resistor 74. In similar fashion, the other ends of the secondary windings 67 and 69a are respectively connected through anode-to-cathode series diodes 76 and 78 coupled through resistor 80. Secondary windings 67 and 69a are center-tapped to one another. The junction of diode 70 and resistor 74 is connected to one side of load resistor 82 through diode 83, the latter and diode 70 having like electrodes coupled. Similarly the junction of diode 76 and resistor 80 is connected to the one side of load resistor 82 through diode 84, diodes 84 and 76 having like electrodes coupled. The center tap of the secondary windings 67 and 69a is connected to the other side of resistor 82. If a square wave appears across secondary winding 69a, a positive voltage of half-wave will be developed across resistor 82, i.e. a synchronizing pulse train is generated, the pulse amplitude being according to the phase relationship of the square wave with the output across secondary winding 67 due to the A.C. input at terminals 20. In effect the circuitry between the secondary windings 67 and 69a operates to compare the frequency and phase of the respective outputs and provide voltage pulses across resistor 82 which are a function of the comparison.

The one side of resistor 82 is connected to the base of transistor 85 which in the form shown is a n-p-n transistor. The emitter of the latter is connected to a voltage divider formed of resistors 86 and 102 between a source of positive voltage $V_1$ of proper magnitude, for example, 24 volts and the center tap to secondary windings 69a. The collector of transistor 85 is connected to base-two of unijunction transistor 88, base-two of the latter and its emitter also being connected respectively through appropriate resistors 90 and 92 to $V_1$.

As a source of square waves induced in secondary winding 69a, there is shown low power oscillator 36 which comprises the primary winding of transformer 69. The ends of this primary winding are connected respectively to the collectors of pnp transistors 94 and 96. The emitters of transistors 94 and 96 are connected to the center-tap of secondary winding 69a, the latter also being connected through capacitor 98 to the emitter of unijunction transistor 88. The bases of transistors 94 and 96 are connected to opposite ends of another secondary winding 69b of transformer 69. Both secondary winding 69b and the primary winding of transformer 69 are center-tapped to one another through resistance 99, the center-tap at the primary winding of transformer 69 being also connected to an appropriate source $V_2$ of negative voltage, e.g. —12 volts. The center-tap at secondary winding 69b is coupled directly to base-one of unijunction transistor 88, and also is connected through resistor 100 and thence in series through the paralleled combination of resistor 102 and capacitor 104 to the emitter of transistor 85.

The voltage pulses developed across resistor 82 by the phase comparison, when sufficiently positive to overcome the bias on transistor 85 will cause the latter to conduct. It will be seen that unijunction transistor acts as a frequency determining element, e.g. a free-running oscillator which, by judicious selection of circuit parameters, preferably normally oscillates to provide pulses at repetition rate which is slightly higher than the frequency of the A.C. line. However, as transistor 85 conducts it will lower the base-two voltage on transistor 88, thereby dropping the output frequency of the latter down to the frequency of the A.C. line. It will be seen that the frequency established by the unijunction transistor, accordingly as transistor 84 conducts, drives oscillator 36. Thus, the action of the phase-sensing network is such that when the A.C. is present at transformer 66, the frequency determining element is driven towards the frequency of the A.C. line and in turn transistor 88 drives and holds the low power oscillator in synchronism and phase with the line.

In order to control the phase of oscillator 36, there is provided in the embodiment of FIG. 3, sampling circuit 106 which comprises capacitor 108, connected to inverter 26 as hereinafter described, and transistor 110. The latter, shown as an npn type which senses voltage on capacitor 108, has its base connected between voltage dividing resistors 112 and 114 which are in series with one another and which shunt capacitor 108. The emitter of transistor 110 is connected through diode 116 to one side of capacitor 108. The other side of capacitor 108 is connected through resistor 118 to the emitter of transistor 110 and is also connected to the emitters of transistors 94 and 96. The collector of transistor 110 is connected directly to the emitter of transistor 85. The bias imposed on transistor 85 is therefore varied according as transistor 110 senses the voltage of capacitor 24. This serves to alter the phase of the output of oscillator 36 until the desired phase comparison or relationship between the inverter and line is established.

The typical square wave generated across the primary winding of transformer 69 of oscillator 36, not only provides the reference signal at secondary winding 69a for comparison by the phase detector, but also is used to drive inverter 26.

Inverter 26 as shown in FIG. 3, operates substantially as described in General Electric Controlled Rectifier Manual, first edition, 1960, pp. 138–139. It is powered by battery 120 connected to input terminals 22. One side of battery 120 is connected to the ends of the primary winding 122 of output transformer 124 respectively through diodes 126 and 128. The other side of the battery is connected through diode 34 to a center-tap on primary winding 122. Capacitor 130 is provided in shunt with winding 122, the ends of the latter also being connected to the respective anodes of SCR 132 and SCR 134. The cathodes of the two SCR's are coupled to one another and thence through inductance 36 to the one side of battery 120. The SCR gates are connected to one another through secondary winding 69c of transformer 69. Winding 69c is center-tapped to the coupled cathodes of SCR 132 and 134.

It will be apparent that the current flow in primary winding 122 is at a frequency determined by the gating of SCR 132 and 134 according to the output of oscillator 36.

After a predetermined time, e.g. about one minute or so, to allow the inverter to be brought toward synchronism, timing motor 40 closes switch 42 putting the A.C. line through reactive impedance 32 across output terminals 24, to the ultimate load. The secondary winding of transformer 124 is also across output terminals 24, so the load can be fed by either or both the inverter or the line A.C. The amplitudes of the two outputs to terminals 24 will be sampled by capacitor 108 which is coupled between the center-tap to secondary winding 122 and the junction of battery 120 with diodes 126 and 128.

If it is desired to employ saturable reactor 44 as described in connection with the embodiment of FIG. 2, the reactor is coupled across the secondary winding of transformer 124 as shown in FIG. 3.

In the event of a drop in the A.C. line voltage, as by a dead-short circuit across terminals 20, the load seen by inverter 26 will be the sum of the external load across terminals 24 and the maximum load provided by reactive impedance 32, all of which the inverter is capable of handling. After the inverter has picked up this load, voltage detector 37 will operate to release switches 42 and 64, disconnecting both detector 38 and the inverter from the shorted line. Upon opening of switch 42, it will be apparent that impedance 32 is also removed from the load on the inverter.

Since certain changes may be made in the above apparatus without departing from the scope of the invention herein involved it is intended that all matter contained in the above description or shown in the accompany drawing shall be interpreted in an illustrative and not in a limiting sense.

What is claimed is:

1. A standby power supply device adapted to be coupled to a load in parallel with an A.C. power line, said device comprising, in combination;
    inverter means having input terminals adapted to be connected to an electrical storage battery, and output terminals adapted to be connected across said load;
    a passive reactive element having a fixed magnitude of impedance, said impedance having a magnitude such that in the event of a short circuit of said power line said impedance limits the total current demand on said inverter means by said load and said impedance to a value which does not exceed the power output capability of said inverter means;
    means connecting said load to said power line in series through said reactive impedance and in parallel with said inverter output terminals; and
    voltage detector means connected to said A.C. power line and having an output coupled to said inverter means for controllably in response to magnitude of voltage in said A.C. power line maintaining the frequency and relative phase of voltage at the output terminals of said inverter means in a predeterminedly fixed relation to the frequency and phase of the voltage of said A.C. power line only when the latter voltage is above a predetermined limit.

2. A standby power supply device adapted to be coupled to a load in parallel with an A.C. power line, said device comprising, in combination;
    inverter means having input terminals adapted to be connected to an electrical storage battery for providing an A.C. output voltage normally of lesser magnitude than the normal magnitude of the voltage of said A.C. power line, and output terminals adapted to connect said output voltage across said load;
    a passive reactive element having a fixed magnitude of impedance, said impedance having a magnitude such that in the event of a short circuit of said power line said impedance limits the total current demand on said inverter means by said load and said impedance to a value which does not exceed the power output capability of said inverter means;
    means connecting said load to said A.C. power line in series through said reactive impedance and in parallel with said output terminals; and
    voltage detector means connected to said A.C. power line and having an output coupled to said inverter means for controllably in response to magnitude of voltage in said A.C. power line synchronising the frequency and relative phase of said A.C. output voltage provided by said inverter means with the frequency and phase of the voltage of said A.C. power line only when the latter voltage is above a predetermined magnitude.

3. A standby power supply device adapted to be coupled to a load in parallel with an A.C. power line, said device comprising in combination;
    inverter means for providing from a D.C. power source, A.C. power at a first voltage lesser than and of the order of magnitude of the normal voltage of said A.C. power line, and having output terminals adapted to connect said first voltage across said load;
    a passive reactive element having a fixed magnitude of impedance, said impedance having a magnitude such that in the event of a short circuit of said power line said impedance limits the total current demand on said inverter means by said load and said impedance to a value which does not exceed the power output capability of said inverter means;
    means connecting said load to said A.C. power line in series through said reactive impedance and in parallel with said output terminals; and
    voltage detector means connected to said A.C. power line and having an output coupled to said inverter means for controllably in response to magnitude of voltage in said A.C. power line establishing and maintaining the frequency and relative phase of said first voltage in a predeterminedly fixed relation to the frequency and phase of the voltage of said A.C. power line only when the latter voltage is above a predetermined magnitude which is less than said first voltage.

4. A device for supplying A.C. power to a load from a D.C. source in the event of power failure of a normal A.C. line source, said device comprising, in combination, first, second and third terminal means adapted respectively to be connected to said A.C. line source, said D.C. power source and said load;

inverter means having an input connected to said second terminal means and an output connected to said third terminal means for providing an A.C. waveform at the latter from D.C. power provided at said input;

a reactive impedance having a magnitude such that in the event of a short circuit of said power line said impedance limits the total current demand on said inverter means by said load and said impedance to a value which does not exceed the power output capability of said inverter means connected in series between said first and third terminal means;

oscillator means capable of being driven in frequency and phase, and having a self-determined fixed frequency when not so driven, and being connected to said inverter means for controlling the output frequency thereof; and voltage detector means connected between said first terminal means and said oscillator means for driving said oscillator means substantially at the frequency of said A.C. line source and in fixed phase relation thereto when the voltage of said A.C. line source is above a predetermined level.

5. A device as defined in claim 4 wherein said voltage detector means for driving said oscillator also comprises means for disconnecting said first terminal means from said third terminal means when said voltage of said A.C. line source drops below said predetermined level.

6. A device as defined in claim 4 wherein the voltage of said A.C. waveform is smaller than, although of the order of magnitude of, the normal voltage of said A.C. line source.

7. A device as defined in claim 6 including unilateral current conducting means in series between said input of said inverter means and said second terminal means.

8. A device for supplying A.C. power from a D.C. source in the event of power failure of a normal A.C. line source, said device comprising, in combination, first, second and third terminal means adapted respectively to be connected to said A.C. line source, said D.C. power source and said load;

inverter means having an input connected to said second terminal means and an output connected to said third terminal means for providing an A.C. waveform at the latter from D.C. power provided at said input;

a reactive impedance having a magnitude such that in the event of a short circuit of said power line said impedance limits the total current demand on said inverter means by said load and said impedance to a value which does not exceed the power output capability of said inverter means;

means for detecting a magnitude of a parameter of voltage of said A.C. line source;

means responsive to the detection of said parameter for connecting said first terminal means through said reactive impedance to said third terminal means in the event that said magnitude is above a predetermined level, and for disconnecting said third terminal means from said first terminal means and said impedance when said magnitude is below said predetermined level;

oscillator means capable of being driven in frequency and phase, and having a self-determined fixed frequency when not so driven, and being connected to said inverter means for controlling the output frequency and phase thereof; and means including said means for detecting said parameter for driving said oscillator substantially at the frequency of said A.C. line source and in predetermined phase relation thereto only when said magnitude is above said predetermined level.

9. A device for supplying A.C. power from a D.C. source in the event of power failure of a normal A.C. line source, said device comprising, in combination, first, second and third terminal means adapted respectively to be connected to said A.C. line source, said D.C. power source and said load;

inverter means having an input connected to said second terminal means and an output connected to said third terminal means for providing an A.C. waveform at the latter from D.C. power provided at said input;

a reactive impedance having a magnitude such that in the event of a short circuit of said power line said impedance limits the total current demand on said inverter means by said load and said impedance to a value which does not exceed the power output capability of said inverter means;

means for detecting an amplitude component of the voltage of said A.C. line source;

means responsive to the detection of said component for connecting said first terminal means through said reactive impedance to said third terminal means in the event that said component is above a predetermined level, and for disconnecting said third terminal means from said first terminal means and said impedance when said component is below said predetermined level;

oscillator means capable of being driven in frequency and phase, and having a self-determined fixed frequency when not so driven, and being connected to said inverter means for controlling the output frequency and phase thereof and means including said means for detecting said amplitude component for comparing the phase of the voltage output of said inverter means and the phase of said voltage of said A.C. line source for providing an output control signal coupled to said oscillator means for driving the latter at the frequency of and in predetermined phase relation to the voltage of said A.C. line source only when said component is above said predetermined level.

10. A device as defined in claim 9 including means, operative responsively to said means for detecting, for delaying the connecting of said first and third terminal means for a predetermined time interval following a detected rise of said component above said predetermined level.

11. A device as defined in claim 9 wherein said predetermined level of said component is substantially below the normal level thereof.

12. A device as defined in claim 11 wherein the voltage of said A.C. waveform is adapted to be lesser than but of the same order of magnitude of the normal voltage level of said A.C. line source, and is greater than said predetermined level.

13. A device according to claim 12 in which said second terminals are adapted to be connected to a D.C. power source by a current regulator whereby said D.C. power source receives charging current when the voltage level of said A.C. line is greater than said A.C. waveform and said inverter is running on power from said A.C. line.

14. A device as defined in claim 9 including saturable reactor means disposed in circuit between said first and third terminal means when the latter are connected, said reactor means being adapted to saturate at a predetermined voltage level of the order of magnitude of but higher than normal voltage level of said A.C. power line and the normal maximum voltage level of the output of said inverter means.

15. A standby power supply device adapted to be coupled to a load in parallel with an A.C. power line, said device comprising, in combination;

inverter means having input terminals adapted to be connected to a D.C. power source, and output terminals adapted to be connected across said load;

a reactive impedance having a magnitude such that in the event of a short circuit of said power line said impedance limits the total current demand on said inverter means by said load and said impedance to a value which does not exceed the power output capability of said inverter means;

voltage level detecting means including diode means for rectifying a sample of the voltage of said A.C. power line, and means responsive to said diode means for producing a signal when the rectified voltage of said diode means exceeds a predetermined magnitude, means coupled to an output from said voltage level detecting means and responsive to said signal for sampling the frequency and phase of the voltage of said A.C. power line;

switch means for connecting said means for sampling to said A.C. power line responsively to said signal;

oscillator means capable of being driven in frequency and phase, and having a self-determined fixed frequency when not so driven, and being connected to said inverter means for controlling the output frequency thereof as a function of the oscillations provided by said oscillator means;

means for sampling the frequency and phase of said oscillations;

means for comparing the sampling of frequencies and phase of said oscillations and the voltage of said A.C. power line for driving said oscillator means into a predetermined synchronous relationship with said voltage of said A.C. power line only when said signal is produced; and means responsive to said signal for connecting said A.C. power line through said impedance and across said load after a predetermined time delay;

the normal average voltage level of the output of said inverter means being adapted to be of the order of magnitude of but less than the normal average voltage level of the power from said A.C. power line.

References Cited

UNITED STATES PATENTS

| | | | |
|---|---|---|---|
| 1,951,482 | 3/1934 | Holden | 307—64 |
| 2,263,320 | 11/1941 | Trucksess | 307—64 |
| 3,201,592 | 8/1965 | Reinert | 307—64 |
| 3,229,111 | 1/1966 | Schumacher | 307—64 |
| 3,293,446 | 12/1966 | Baude | 307—66 |

ORIS L. RADER, *Primary Examiner.*

T. J. MADDEN, *Assistant Examiner.*